(12) United States Patent
Amidi et al.

(10) Patent No.: US 9,965,193 B2
(45) Date of Patent: May 8, 2018

(54) APPARATUS, SYSTEM, AND METHOD OF SEQUENCING, SHADOWING, AND QUEUING OPERATIONS IN A NON-VOLATILE STORAGE MEMORY

(71) Applicant: Xitore, Inc., Mission Viejo, CA (US)

(72) Inventors: Mike Hossein Amidi, Lake Forest, CA (US); Vahab Alemzadeh, Mission Viejo, CA (US)

(73) Assignee: XITORE, INC., Mission Viejo, CA (US)

( * ) Notice: Subject to any disclaimer, the term of this patent is extended or adjusted under 35 U.S.C. 154(b) by 87 days.

(21) Appl. No.: 15/202,347

(22) Filed: Jul. 5, 2016

(65) Prior Publication Data

US 2016/0378340 A1 Dec. 29, 2016

Related U.S. Application Data

(63) Continuation-in-part of application No. 15/194,248, filed on Jun. 27, 2016.

(60) Provisional application No. 62/188,159, filed on Jul. 2, 2015, provisional application No. 62/185,466, filed on Jun. 26, 2015.

(51) Int. Cl.
  *G06F 12/00* (2006.01)
  *G06F 3/06* (2006.01)
  *G06F 13/18* (2006.01)

(52) U.S. Cl.
  CPC ............ *G06F 3/061* (2013.01); *G06F 3/0659* (2013.01); *G06F 3/0688* (2013.01); *G06F 13/18* (2013.01)

(58) Field of Classification Search
  None
  See application file for complete search history.

(56) References Cited

U.S. PATENT DOCUMENTS

| | | | | |
|---|---|---|---|---|
| 7,379,316 B2* | 5/2008 | Rajan | ........................ | G11C 5/02 365/52 |
| 7,404,021 B2* | 7/2008 | Wilkins | ................ | G06F 3/0613 710/1 |
| 2003/0120865 A1* | 6/2003 | McDonald | .............. | G06F 3/061 711/114 |
| 2005/0050240 A1* | 3/2005 | Wilkins | ................ | G06F 3/0613 710/15 |
| 2012/0268982 A1* | 10/2012 | Rajan | ........................ | G11C 5/02 365/149 |

* cited by examiner

*Primary Examiner* — Brian Peugh
(74) *Attorney, Agent, or Firm* — Andrew Mar; Fish IP Law, LLP

(57) ABSTRACT

An improved way of communicating data operation commands within a non-volatile storage controller is presented. The non-volatile storage controller includes an internal processing unit that is communicatively coupled with an associated host system, a master controller, and a plurality of local controllers that are communicatively coupled with a non-volatile memory. Upon receiving a series of data operations commands from the host system, the internal processing unit is configured to apply address shadowing when communicating the series of commands to the master controller such that the internal processing unit does not need to repetitively send the same set memory addresses to the master controller when issuing the series of commands.

20 Claims, 12 Drawing Sheets

APPARATUS, SYSTEM, AND METHOD OF SEQUENCING, SHADOWING, AND QUEUING OPERATIONS IN A NON-VOLATILE STORAGE MEMORY

This application is a continuation-in-part of U.S. application Ser. No. 15/194,248, filed on Jun. 27, 2016, which claims the benefit of U.S. provisional application No. 62/185,466, filed Jun. 26, 2015. This application also claims the benefit of U.S. provisional application No. 62/188,159, filed Jul. 2, 2015. This and all other extrinsic references referenced herein are incorporated by reference in their entirety.

FIELD OF THE INVENTION

The field of the invention is non-volatile memory devices

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Computer systems ("host systems" or "host computer systems") utilize non-volatile storage to store data. The data can then be retrieved, fetched, analyzed, processed, and restored by one or more computer system in the future. The main advantage to store data in non-volatile storages is for persistently storing data, which allows access to the data after power cycling of the host computer system and allows other computer systems to access the same data.

Today, due to ongoing demand for high speed data storage, digital storage units in both consumer and enterprise levels incorporate one or more internal circuitries to assist in storing and retrieving data from the associated host computer system in the non-volatile memories disposed in the storage unit. The internal circuitries enable the non-volatile storage unit to process large amount of host system data more efficiently.

In order for a non-volatile storage unit to provide high speed operations to host data, a conventional non-volatile storage unit incorporates a series of non-volatile storage element controller capable of communicating the required commands, address, and data to the corresponding non-volatile storage element in parallel. In the configuration, the series of non-volatile storage controllers enable higher bandwidth host system data throughput compared to single Non-volatile storage controller units.

However, this architecture requires multiple cycles of performing the same operation over and over to properly initialize, set features, and issue commands to each controller in the series of non-volatile storage element controller. The replication and repetitive sequential process requires more power consumption, longer latency, and higher thermal dissipation, and in turn, overall higher cost to consumers.

Thus, there remains a need for a system and method that improves the power consumption and speed for processing large amount of host system data in a non-volatile storage unit.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems, and methods to provide fast and power efficient data operations in a non-volatile storage unit that works with a host computer system. In some embodiments, the non-volatile storage system includes a multi-layered controller architecture that facilitates high speed and low power data operations with an array of non-volatile memories. The non-volatile storage system includes an internal processing unit, a master controller, multiple local controllers, and an array of non-volatile memories. Each local controller is configured to perform data operations on its corresponding non-volatile memory via a series of ports. The master controller is communicatively coupled with all of the local controllers, and is configured to broadcast commands to the local controllers.

The internal processing unit communicates commands and data with the host computer system. Upon receiving operation requests from the host computer system, the internal processing unit groups related operations together as different groups of related operations, and sends the groups of related operations to the master controller one at a time.

Once the master controller receives a group of related operations, the master controller broadcasts the operations to the local controllers. The local controllers in turn execute the operations on their corresponding non-volatile memories in parallel.

In some embodiments, the group of related operations includes multiple types of operations to be executed on a common set of memory address locations. In some of these embodiments, the master controller is configured to first transmit the common set of memory addresses to the appropriate local controllers. The master controller is configured to then broadcast the first type of operation as a first command to the local controllers.

In some embodiments, each local controller includes a commands queue for storing incoming commands to be processed. Upon detecting a broadcast of the first command from the master controller, each local controller is configured to store the first command in its corresponding queue. The local controller is then configured to pull a command from the queue and begin processing the command. By executing the command, the local controller is configured to perform three steps: issuing the command, waiting for the command to be executed by the corresponding non-volatile memory, and relaying a confirmation to the master controller that the command has been successfully executed. In some embodiments, the local controllers are configured to execute the command in parallel.

In some embodiments, the master controller is configured to broadcast a second command associated with a second type of operations to the local controllers while the local controllers are still executing the first command. The local controllers are configured to put the second command in their respective queues. Once the first command has been successfully executed, the local controllers are configured to then take the second command from the queue and begin executing it.

In some embodiments, the master controller is configured to broadcast a third command associated with a third type of operations to the local controllers while the local controllers are still executing the first command or the second command. In some of these embodiments, the local controllers are configured to execute the commands in the commands queue in a first-in-first-out order.

Various objects, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

DETAILED DESCRIPTION

Figure 1:
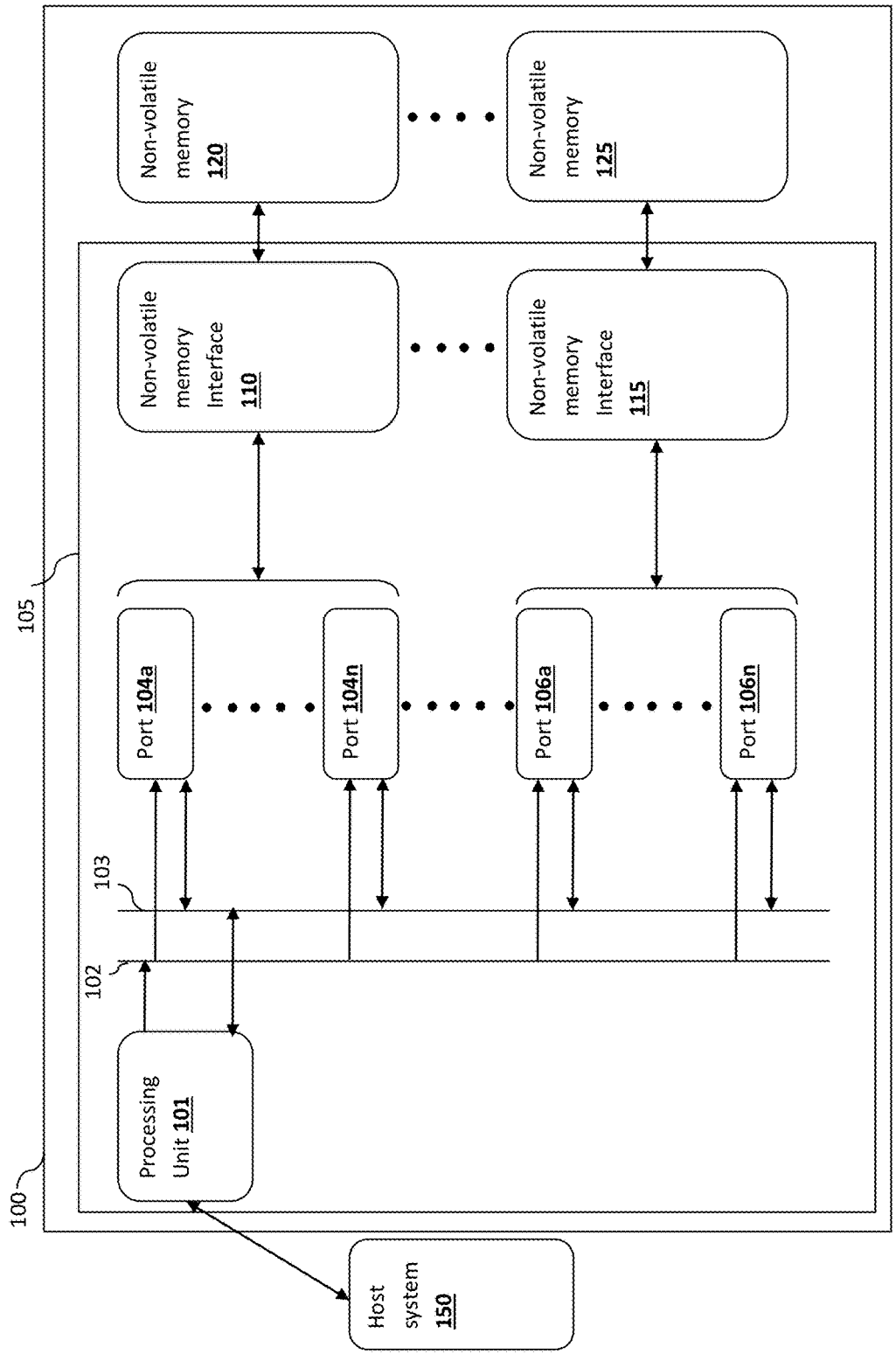
FIG. 1 is a schematic of a conventional non-volatile storage system.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. As used herein, the term "operatively coupled to" refers to electronic components that are coupled with one another such that an electronic communication path exists between one electronic hardware component and another electronic hardware component.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer system should be read to include any suitable combination of computing devices, including servers, interfaces, systems, databases, agents, peers, engines, controllers, or other types of computing devices operating individually or collectively. A "host" computer system is a functional computer system having a processor and motherboard to which a storage unit could be operatively coupled to in order to serve as a computer-readable medium for the computer system. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. Computer software that is "programmed" with instructions is developed, compiled, and saved to a computer-readable non-transitory medium specifically to accomplish the tasks and functions set forth by the disclosure when executed by a computer processor.

The inventive subject matter provides apparatus, systems, and methods to provide fast and power efficient data operations in a non-volatile storage unit that works with a host computer system. In some embodiments, the non-volatile storage system includes a multi-layered controller architecture that facilitates high speed and low power data operations with an array of non-volatile memories. The non-volatile storage system includes an internal processing unit, a master controller, multiple local controllers, and an array of non-volatile memories. The internal processing unit communicates commands and data with the host computer system. Upon receiving operation requests from the host computer system, the internal processing unit groups related operations together as different groups of related operations, and sends the groups of related operations to the master controller one at a time.

Once the master controller receives a group of related operations, the master controller broadcasts the operations to the local controllers. The local controllers in turn execute the operations on their corresponding non-volatile memories in parallel.

FIG. 1 shows a schematic of a conventional non-volatile storage unit 100. The conventional non-volatile storage unit 100 includes a non-volatile storage controller 105 and an array of non-volatile memories including many non-volatile memories (e.g., non-volatile memory 120, non-volatile memory 125, etc.). The non-volatile storage controller 105 includes an internal processing unit 101, a clock bus 102 for transmitting addresses, commands, and control signals, an internal data bus 103, and many non-volatile controller ports (e.g., ports 104a-104n, 106a-106n, etc.). These components collectively represent a conventional non-volatile storage controller 105 of the non-volatile storage unit 100. As shown, the non-volatile storage unit 100 is communicatively coupled with a host system 150, for example, via a north/south bridge or a short range communication interface (e.g., USB connection, Bluetooth connection, etc.).

A host system as used herein is defined as an electronic system that includes a motherboard. In some embodiments, the host system includes at least one processing unit (e.g., a processor, a processing core, etc.) and at least one volatile memory (e.g., dynamic random-access memory (DRAM), etc.) disposed on the motherboard, and the motherboard facilitates the communications between the processing unit, the volatile memory and other peripherals (such as the non-volatile storage system as disclosed herein, graphics card, etc.).

As used herein, a "north bridge" is a chip in the chipset of the motherboard that connects high speed buses, such as an FSB (front-side bus), a main memory bus, and/or a PCIe bus. As used herein a "south bridge" is another chip in the chipset of the motherboard that connects slower busses, such as a PCI bus, a USB (universal serial bus), and a SATA bus. The north bridge and the south bridge could be operationally coupled to one another using a DMI (direct media interface) bus.

Figure 2:
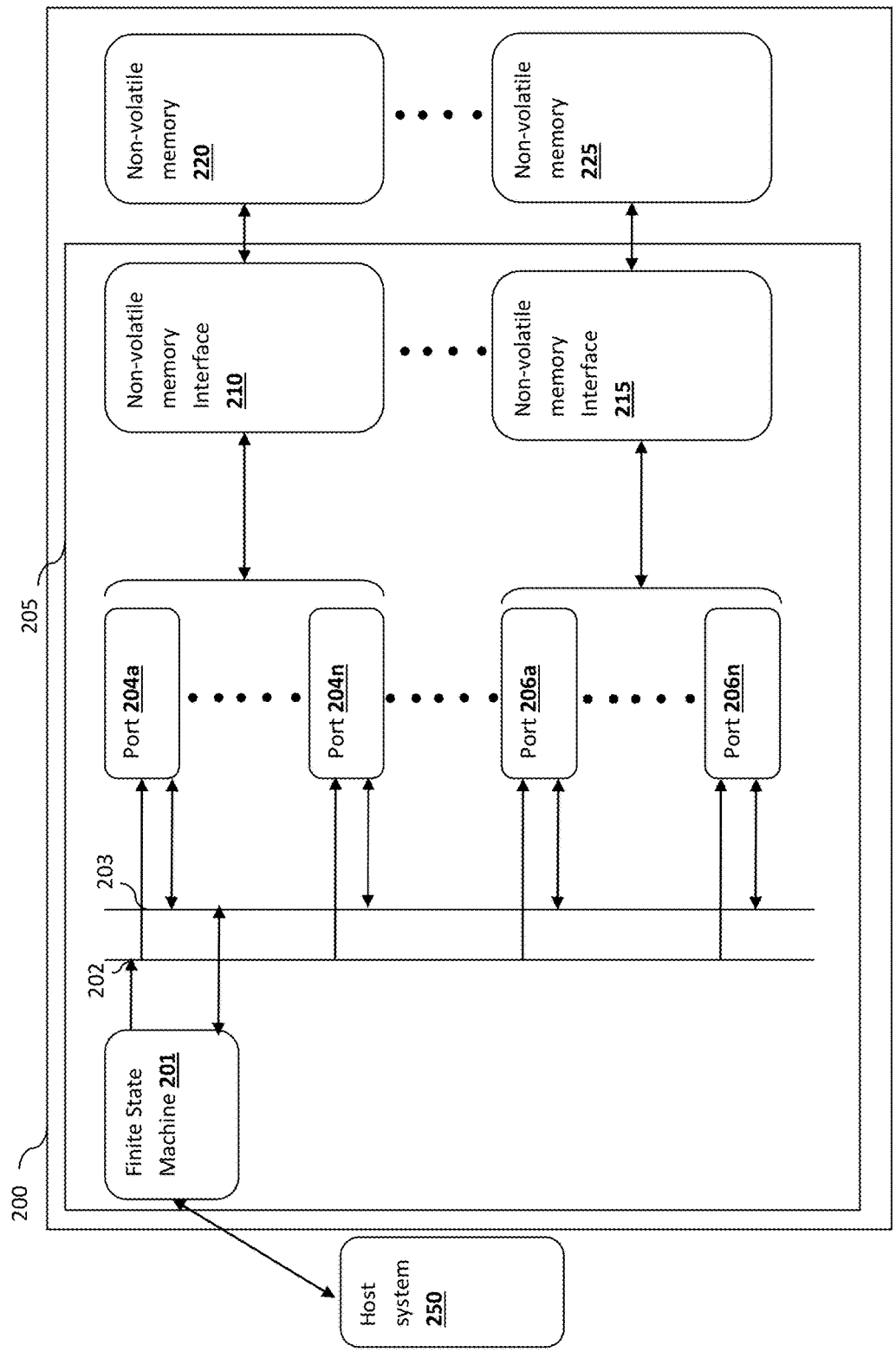
FIG. 2 is a schematic of another conventional non-volatile storage system.

FIG. 2 shows a schematic of another conventional non-volatile storage unit 200. The conventional non-volatile storage unit 200 includes a non-volatile storage controller 205 and an array of non-volatile memories including many non-volatile memories (e.g., non-volatile memory 220, non-volatile memory 225, etc.). The non-volatile storage controller 205 includes finite state machine 201, a clock bus 202 for transmitting addresses, commands, and control signals, an internal data bus 203, and many non-volatile controller ports (e.g., ports 204a-204n, 206a-206n, etc.). These components collectively represent a conventional non-volatile storage controller 205 of the non-volatile storage unit 200. As shown, the non-volatile storage unit 200 is communicatively coupled with a host system 250, for example, via a north/south bridge or a short range communication interface (e.g., USB connection, Bluetooth connection, etc.).

The conventional non-volatile storage controllers 105 and 205 both suffer the same problem. Whenever there is a series of operations to be performed on the non-volatile memories, the controllers 105 and 205 had to perform one operation at a time, in a daisy chain fashion. When performing each operation, the controllers 105 and 205 issues a command (e.g., a read command, an erase command, a write command, etc.) and a memory address to the controller ports (e.g., ports 104a-104n, ports 206a-206n, etc.), waits for the command to be executed on the non-volatile memories, and then confirm the status of the operations. To complete a series of operations, such as a read, an erase, and then a write, on a same set of memory addresses, the controllers 105 and 205 have to perform the above steps for each operation. Thus, the controllers 105 and 205 have to issue a read command, wait, confirm the status of the read command, and then repeat the steps for the erase command and finally the write command. One can image the time and power it takes to perform such a series of operation.

Figure 3:
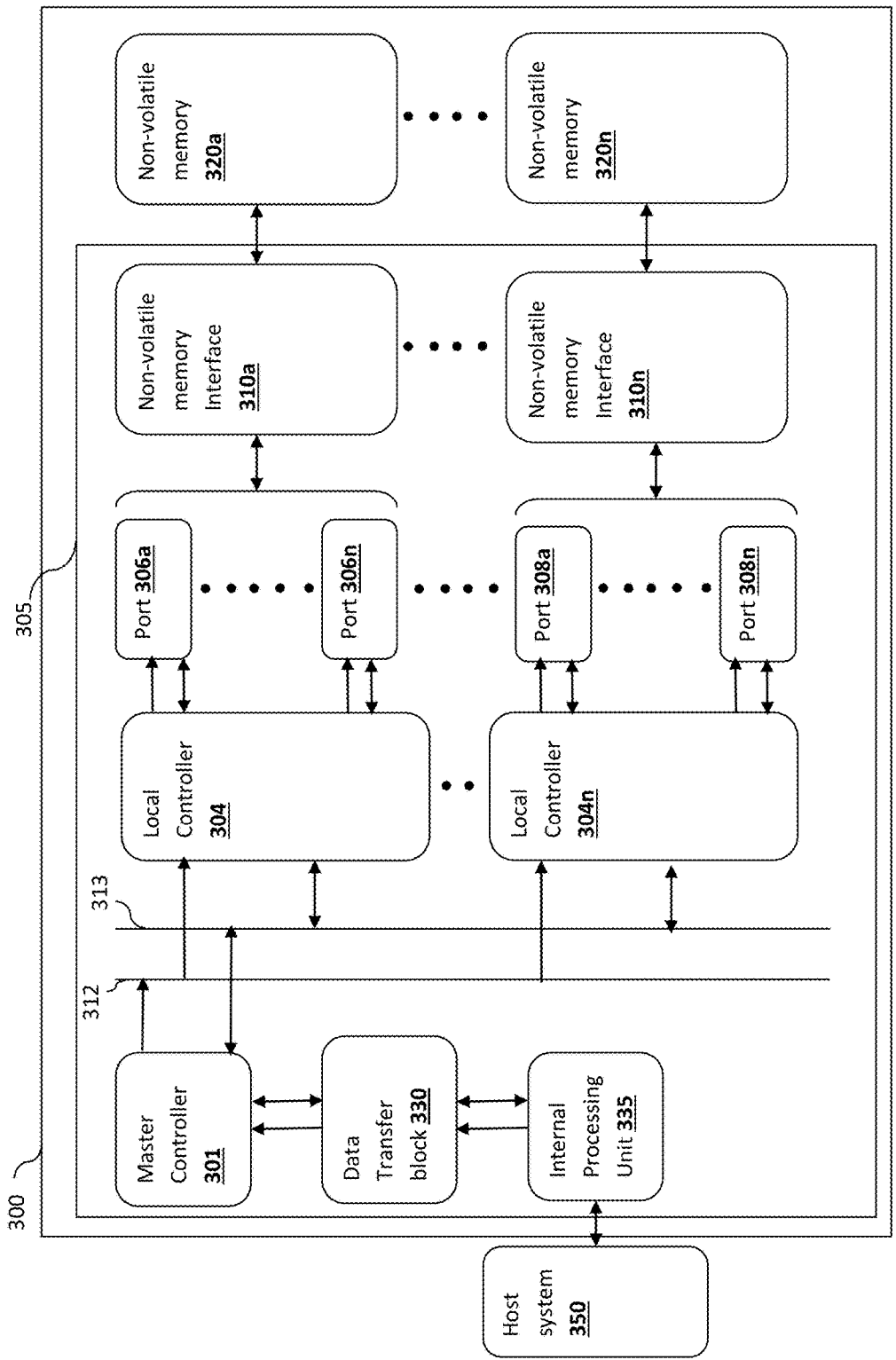
FIG. 3 is a schematic of a non-volatile storage system of some embodiments.

FIG. 3 shows a schematic of a non-volatile storage controller 300 of some embodiments. The non-volatile storage controller 300 includes a master controller 301, a data transfer block 330, an internal processing unit 335, one or more local controllers (e.g., local controllers 304a-304n, etc.), one or more non-volatile controller ports (e.g., ports 306a-306n, ports 308a-308n, etc.), one or more non-volatile memory interfaces (e.g., non-volatile memory interfaces 310a-310n, etc.), a clock bus 312 for transmitting addresses, commands, and control signals, and an internal data bus 313.

As shown, the non-volatile storage controller 300 is communicatively coupled (e.g., connected to) an array of non-volatile memories (e.g., non-volatile memories 320a-320n). Each of local controller (e.g., local controllers 304a-304n) is associated with one non-volatile memory in the array of non-volatile memories. For example, the local controller 304a corresponds to the non-volatile memory 320a, and the local controller 304n corresponds to the non-volatile memory 320n. Each local controller communicates with the corresponding non-volatile memory via a series of ports and a non-volatile memory interface. For example, the local controller 304a communicates with (e.g., sends commands and receives data, etc.) the non-volatile memory 320a via ports 306a-306n and the non-volatile memory interface 310a. Similarly, the local controller 304n communicates with (e.g., sends commands and receives data, etc.) the non-volatile memory 320n via ports 308a-308n and the non-volatile memory interface 310n.

The master controller 301 is communicatively coupled with the local controllers 304a-304n via the clock bus 312 and the internal data bus 313. The master controller 301 is configured to broadcast commands and data to the local controllers 304a-304n via the clock bus 312.

The internal processing unit 335 is communicatively coupled with the master controller 301 via the data transfer block 330. The data transfer block 330 is an intermediate element when data are being transmitted between the internal processing unit 335 and the master controller 301. The data transfer block 330 can be implemented in many different ways, such as one or more buffer, one or more multiplexer and de-multiplexer, one or more FIFO, one or more LIFO, one or more cache to properly buffer, cache, hold, stage, and pass through as an intermediate staging of storing and or retrieving host system user data to and from non-volatile memory elements and or arrays.

The internal processing unit 335 is communicatively coupled with a host system 350, for example, via a north/south bridge or a short range communication interface (e.g., USB connection, Bluetooth connection, etc.). The internal processing unit 335 of some embodiments can be a processor (or a processing core) such as an Intel® Core i7, an AMD Athlon processor, etc. or any other types of programmable chip that can be programmed (by executing a software program) to perform a set of functions for the non-volatile storage controller 305. In other embodiments, the internal processing unit 335 is a finite state machine (i.e., non-programmable hardware based digital logic circuits) configured to perform a set of functions for the non-volatile storage controller 305. The internal processing unit 335 is configured to receive operation requests associated with the non-volatile storage controller 300 from the host system 350. Examples of such operation requests include a read request, an erase request, a write request, and any other data storage related requests. Each request is usually accompanied by a memory address to indicate a location in the array of non-volatile memories on which to operate the operation request.

When the internal processing unit 335 receives operation requests from the host system 350, the internal processing unit 335 is configured to group related operation requests together as different groups of related operation requests. Preferably, each group of related operation requests includes the same types of operations (common operations) to be performed at multiple memory address locations. For example, one group of related operations can include a read operation request for multiple address locations. Another group of related operations can include a read, erase, and then write operations for multiple address locations.

The internal processing unit 335 is then configured to send each group of related operations to the master controller 301 in a single transmission. Upon receiving a group of related operations from the internal processing unit 335, the master controller 301 is configured to cause the local controllers 304a-304n to execute, in parallel, the related operations on the array of non-volatile memories (volatile memories 320a-320n) according to the memory addresses.

The master controller 301 can use different techniques to cause the local controllers 304a-304n to execute the operations in parallel. In some embodiments, the master controller 301 is configured to first transmit the memory addresses to the appropriate local controllers 304a-304n via the clock bus 312, based on which local controller is responsible for which memory addresses. In some embodiments, the clock bus 312 has sufficient width to transmit the memory addresses to all local controllers 304a-304n. For example, each local controller may needs ten bits of space to hold a memory address, and there are five local controllers. If the clock bus 312 is 50-bit wide, theoretically, it has a capability to issue five distinct separate addresses to all 5 local controllers at one transfer time.

The master controller 301 is configured to then broadcast a command associated with the common operation (e.g., read operation, etc.) to the local controllers 304a-304n. Upon receiving the broadcasted command, the local controllers 304a-304n are configured to execute, in parallel, the command with their corresponding non-volatile memories 320a-320n via the corresponding ports and non-volatile memory interfaces.

As mentioned above, the group of related operations sometimes may include multiple types of operations to be executed on the multiple memory address locations. For example, it is common for the host computer to request a read operation and then a write operation, which in some non-volatile memory types such as flash drives are translated to three operations: a read operation, an erase operation, and a write operation. Thus, in some embodiments, after transmitting the memory addresses, the master controller 301 is configured to broadcast a first command associated with a first type of common operation (e.g., a read command). Upon receiving the first command, the local controllers 304a-304n are configured to begin executing the first command on the non-volatile memories 320a-320n in parallel, according to the memory addresses that was transmitted.

As mentioned above, executing a command on the non-volatile memories 320a-320n may involve three steps: issuing the command, waiting for the execution to be completed, and confirming that the command is executed. In some embodiments, while the local controllers 304a-304n are executing the first command, the master controller 301 is configured to broadcast a second command associated with a second type of common operation (e.g., an erase command) to the local controllers 304a-304n.

In some of these embodiments, each of the local controllers 304a-304n has a queue for storing incoming commands. As such, as each of the local controllers 304a-304n receives a new broadcasted command, the local controller is configured to put the new command in its queue, and take the command out of the queue as it executes the command. In this example, each local controller is configured to put the first command (e.g., the read command) in the queue when the master controller broadcasted the first command. As the local controllers 304a-304n, begins to execute the first command, the local controllers 304a-304n are configured to take the first command out of their respective queues. When the local controllers 304a-304n receives the second command (e.g., the erase command), the local controllers 304a-304n are configured to put the second command in their respective queues.

However, since the local controllers 304a-304n are still in the process of executing the first command, the second command has to wait in the queue in the time being. In some embodiments, after broadcasting the second command, the master controller 301 is configured to broadcast a third command associated with a third type of common operations (e.g., a write command) to the local controllers 304a-304n. At this time, the local controllers 304a-304n might still be executing the first command or beginning to execute the second command. Again, the local controllers 304a-304n are configured to place the third command to their respective queues.

In some embodiments, the local controllers 304a-304n are configured to execute the commands in their respective queues in a first-in-first-out order. Thus, after the local controllers 304a-304n receive confirmations from the non-volatile memories 320a-320n that the first command is completed, the local controllers 304a-304n are configured to begin executing the second command (i.e., the next command in their respective queues) in parallel on the volatile memories 320a-320n according to the transmitted memory addresses. When the local controllers 304a-304n receives confirmations from the non-volatile memories 320a-320n that the second command is completed, the local controllers 304a-304n are configured to begin executing the third command (i.e., the next command in their respective queues) in parallel on the volatile memories 320a-320n according to the transmitted memory addresses.

Since the internal processing unit 335 is able to offload a batch of operations (e.g., groups of related operations) all at once to the master controller 301, without having to go through the steps of issuing commands, waiting, and confirming, the bandwidth and processing capability of the internal processing unit 335 increases dramatically. Specifically, the internal processing unit 335 is able to perform other processes for the host system 350 while the master controller 301 and the local controllers 304a-304n executes the batch of operations in parallel.

Figure 4:
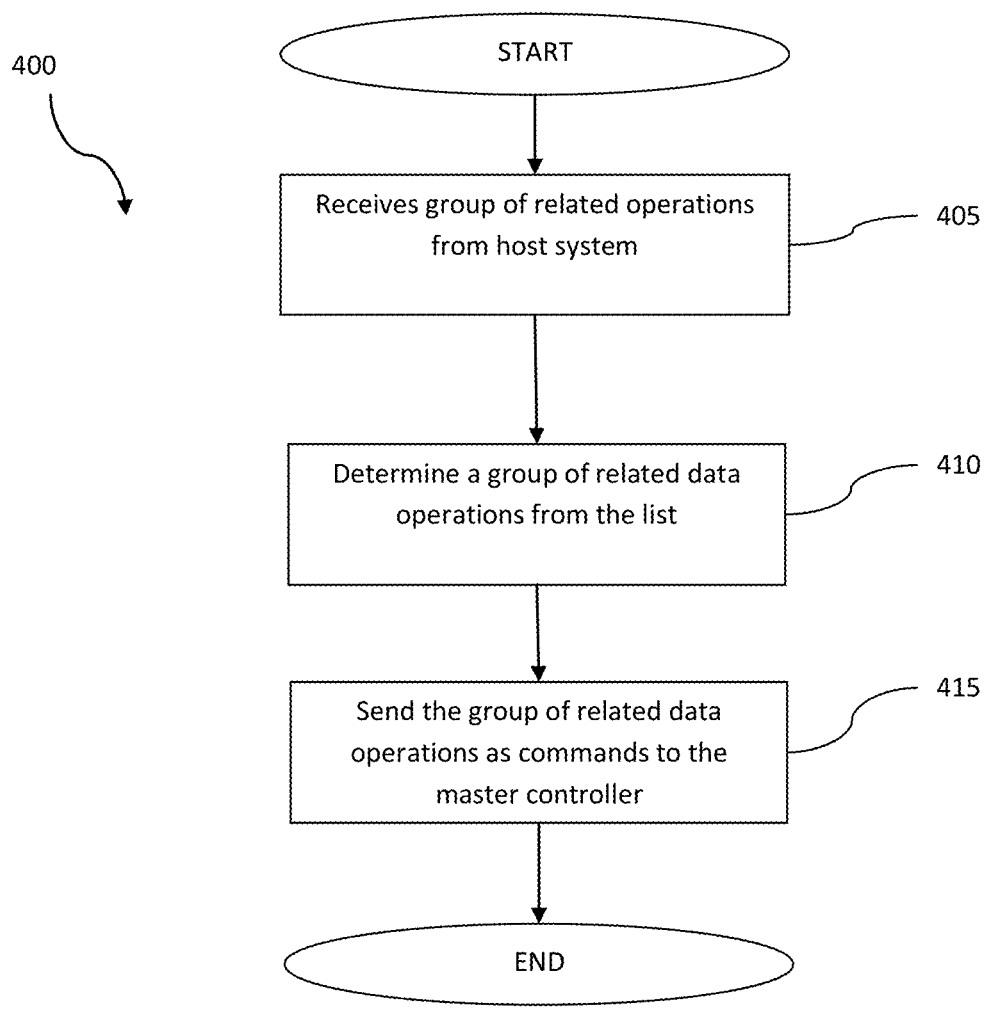
FIG. 4 illustrates a process performed by an internal processing unit of a non-volatile storage system of some embodiments.

FIG. 4 illustrates a process 400 performed by the internal processing unit of the non-volatile storage system of some embodiments. The process 400 begins by receiving (at step 405) a list of data operation from the host system. The process 400 then determines (at step 410) a group of related data operations from the list. As mentioned above, the group of related data operations includes one or more common types of operations to be performed on multiple address location of the non-volatile memories. The process 400 then sends (at step 415) the group of related data operations to the master controller in a single transmission. In some embodiments, the internal processing unit does not pause for the group of related operations to be completed. Instead, once the group of related data operations is sent to the master controller, the internal processing unit can immediately handle other operations for the host system, or receive another list of data operations from the host system and repeats steps 405-415.

Figure 5:
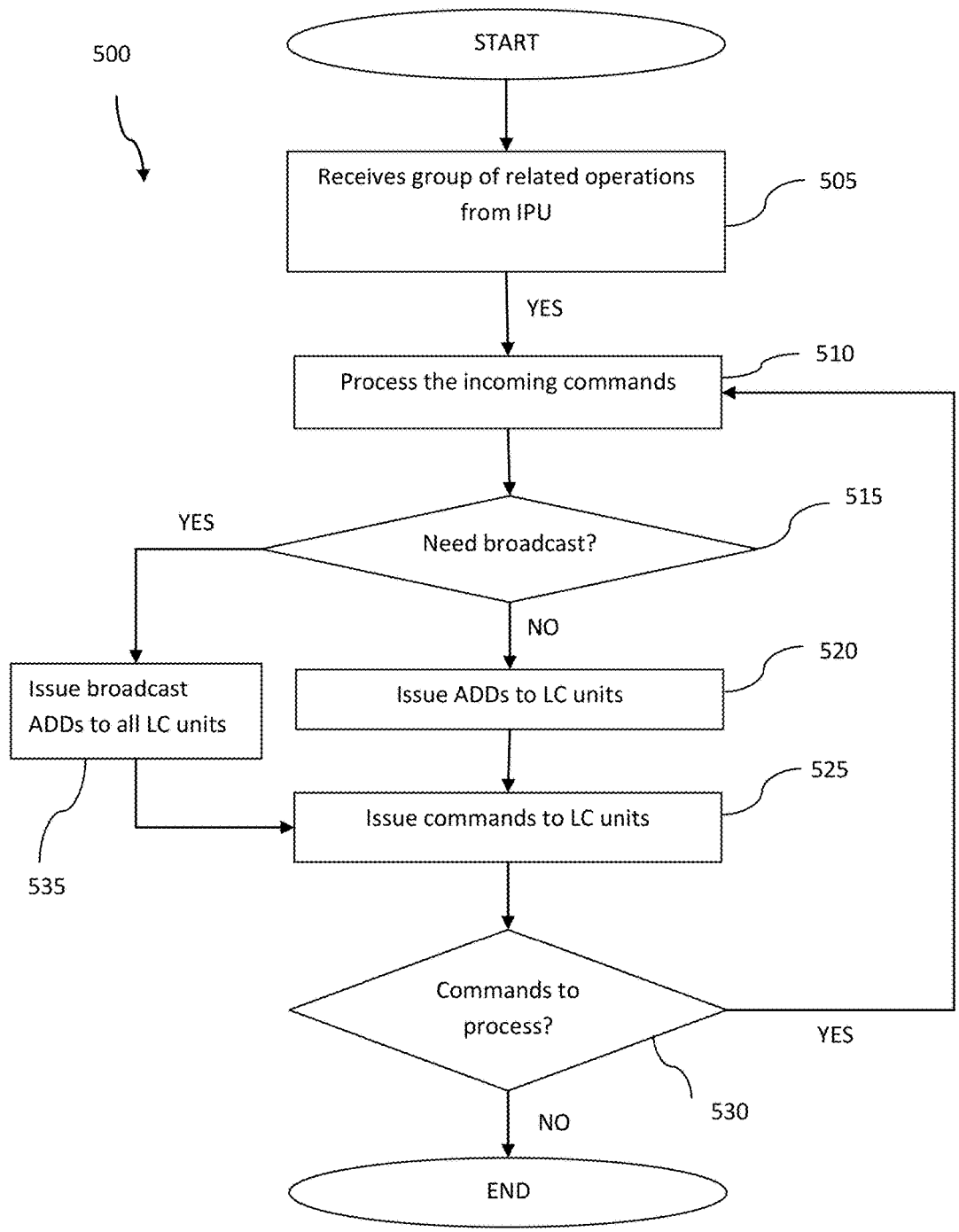
FIG. 5 illustrates a process performed by a master controller of a non-volatile storage system of some embodiments.

FIG. 5 illustrates a process 500 performed by the master controller of the non-volatile storage system of some embodiments. The process 500 begins by receiving (at step 505) an operation request from the internal processing unit. The operation request can be a single operation request or a group of related operations, as described in process 400 of FIG. 4. The process 500 then begins (at step 510) to process the operation request. In some embodiments, the process 500 determines (at step 515) whether the operation request requires broadcasting. The master controller can determine whether broadcasting is necessary by determining if the operation request includes a single operation or a group of related operations. If the operation request includes a single operation, then broadcasting is not needed. In that case, the process 500 issues (at step 520) memory addresses to the local controllers to process the operation and then issues (at step 525) a single command to the local controllers.

On the other hand, if the operation request includes a group of related operations, then broadcasting is needed. In that case, the process 500 transmits (at step 535) memory addresses (included in the operation request) to the local controllers, and then broadcasts (at step 525) commands, one type at a time, to the local controllers to execute. In some embodiments, the master controller does not wait until the local controllers receive confirmation that the previously issued command is executed before broadcasting a new command to the local controllers. In addition, under this broadcasting scheme, after the memory addresses are transmitted to the local controllers the first time, the master controller only needs to broadcast subsequent commands to the local controllers without transmitting the memory addresses to the local controllers again. For example, if the group of related operations includes a read, erase, and write commands, the master controller will first transmits the memory addresses to the appropriate local controllers. The master controller then broadcasts the first command (e.g., read) to all local controllers. While the local controllers are still executing the first command, the master controller broadcasts the second command (e.g., erase) without transmitting the memory addresses to the local controllers again. Similarly, while the local controllers are still executing the first command or the second command, the master controller broadcasts the third command (e.g., write) to the local controllers without transmitting the memory addresses to the local controllers again.

The process 500 then determines (at step 530) whether there is any more operation request from the internal processing unit. If there are no more requests, the process 500 ends. If there are more requests, the process 500 reverts back to step 510 and iterates through steps 510 through 530.

Figure 6:
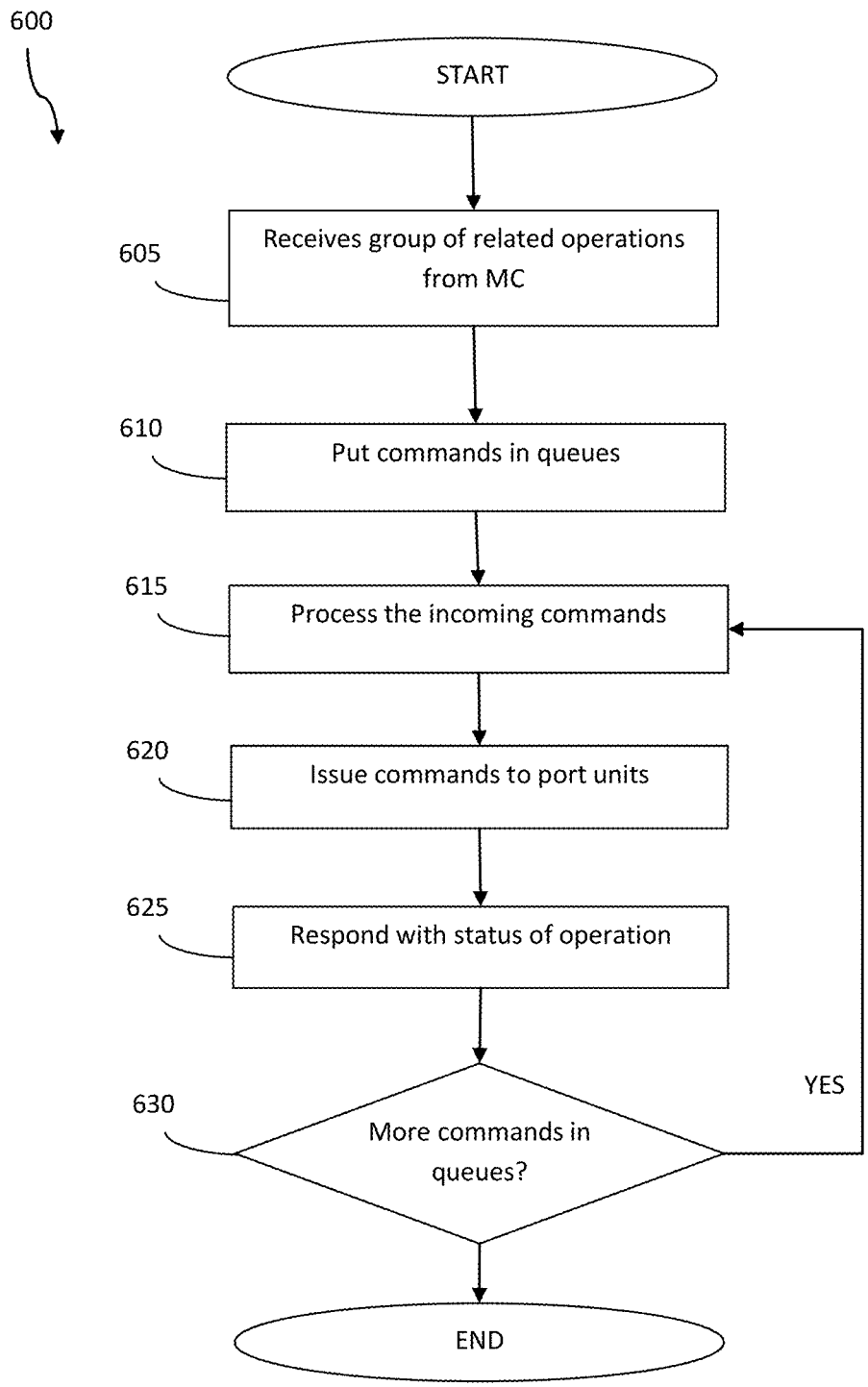
FIG. 6 illustrates a process performed by a local controller of a non-volatile storage system of some embodiments.

FIG. 6 illustrates a process 600 performed by each of the local controllers of the non-volatile storage system of some embodiments. The process 600 begins by receiving (at step 605) transmitted memory addresses and then commands from the master controller. As mentioned above, each local controller has a commands queue for storing incoming commands, waiting to be processed. As the local controller receives commands from the master controller, the local controller puts (at step 610) the commands in the queue in the order they are received. The process 600 then retrieves (at step 615) a command from the queue and begins processing the command. In some embodiments, the local controller uses a first-in-first-out order to retrieve the commands from the queue.

Upon retrieving a command from the queue, the process 600 issues (at step 620) the retrieved commands to the ports, waits, and then responds (at step 625) with the status of operation to the master controller. The process 600 then determines (at step 630) whether there are more commands in the queues. If there are no more commands in the queues, the process 600 ends. On the other hand, if there are more commands in the queues, the process 600 reverts back to step 615 and iterates through step 630.

Figure 7:
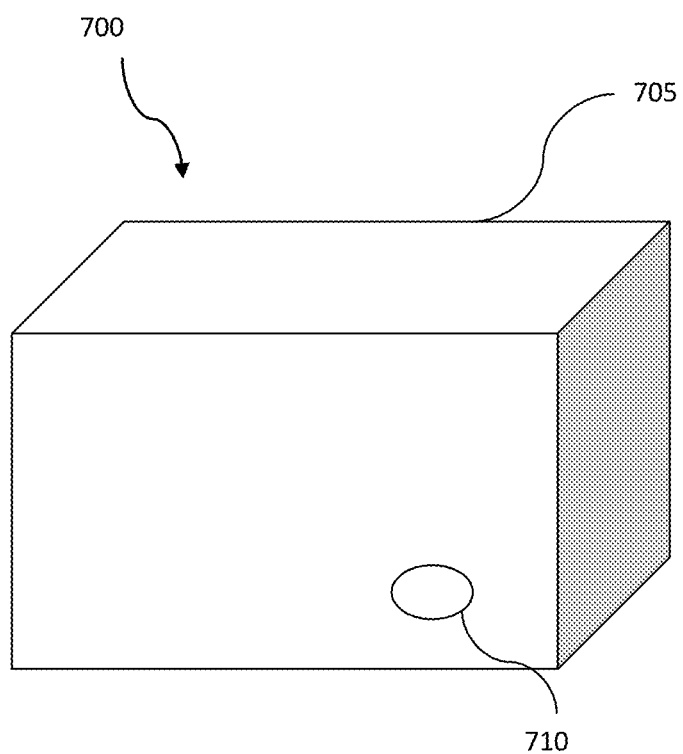
FIG. 7 shows an exemplary non-volatile storage unit of some embodiments.

In some embodiments, a non-volatile storage unit is provided. FIG. 7 illustrates an example non-volatile storage unit 700. The non-volatile storage unit 700 includes a housing 705 that encloses the elements of the non-volatile storage controller 300 of FIG. 3. In some of these embodiments, the housing exposed the host system interface 710. The host system interface 710 can be implemented as an electronic connector that is configured to connect with the host system 350.

Figure 8:
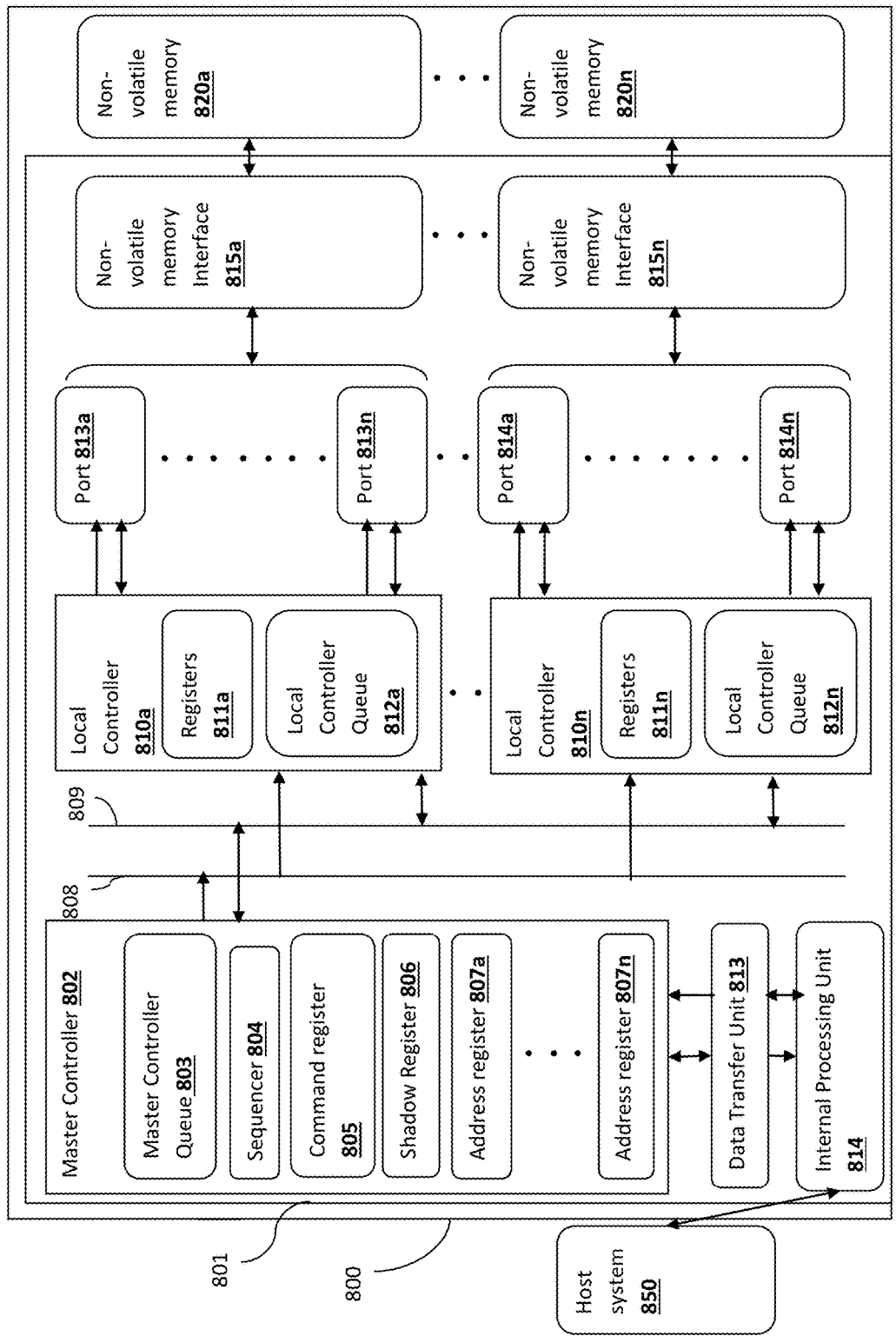
FIG. 8 is a schematic of another non-volatile storage system of some embodiments.

In another aspect of the inventive subject matter, it is conceived that the communication between the internal processing unit and the master controller of a non-volatile storage system can be improved by using address shadowing. FIG. 8 illustrates a non-volatile storage system 800 of some embodiments that use address shadowing to facilitate communication between the internal processing unit and the master controller. The non-volatile storage system 800 includes a non-volatile storage controller 801 that is very much similar to the non-volatile storage controller 300 of FIG. 3, including a master controller 802, a data transfer unit 813, an internal processing unit 814, one or more local controllers (e.g., local controllers 810*a*-810*n*, etc.), one or more non-volatile controller ports (e.g., ports 813*a*-813*n*, ports 814*a*-814*n*, etc.), one or more non-volatile memory interfaces (e.g., non-volatile memory interfaces 815*a*-815*n*, etc.), a clock bus 808 for transmitting addresses, commands, and control signals, and an internal data bus 809.

As shown, the non-volatile storage controller 801 is communicatively coupled (e.g., connected to) an array of non-volatile memories (e.g., non-volatile memories 820*a*-820*n*). Each of the local controllers (e.g., local controllers 810*a*-810*n*) is associated with one non-volatile memory in the array of non-volatile memories. For example, the local controller 810*a* corresponds to the non-volatile memory 820*a*, and the local controller 810*n* corresponds to the non-volatile memory 820*n*. Each local controller communicates with the corresponding non-volatile memory via a series of ports and a non-volatile memory interface. For example, the local controller 810*a* communicates with (e.g., sends commands and receives data, etc.) the non-volatile memory 820*a* via ports 813*a*-813*n* and the non-volatile memory interface 815*a*. Similarly, the local controller 810*n* communicates with (e.g., sends commands and receives data, etc.) the non-volatile memory 820*n* via ports 814*a*-814*n* and the non-volatile memory interface 815*n*.

The master controller 802 is communicatively coupled with the local controller 810*a*-810*n* via the clock bus 808 and the internal data bus 809. The master controller 802 is configured to broadcast commands and data to the local controllers 810a-810n via the clock bus 808 and the data bus 809.

The internal processing unit 814 is communicatively coupled with the master controller 802 via the data transfer unit 813. The data transfer unit 813 is an intermediate element when data are being transmitted between the internal processing unit 814 and the master controller 802. The data transfer unit 813 can be implemented in many different ways, such as one or more buffer, one or more multiplexer and de-multiplexer, one or more FIFO, one or more LIFO, one or more cache to properly buffer, cache, hold, stage, and pass through as an intermediate staging of storing and or retrieving host system user data to and from non-volatile memory elements and or arrays.

The internal processing unit 814 is communicatively coupled with a host system 850, for example, via a north/south bridge or a short range communication interface (e.g., USB connection, Bluetooth connection, etc.). The internal processing unit 814 of some embodiments can be a processor (or a processing core) such as an Intel® Core i7, an AMD Athlon processor, etc. or any other types of programmable chip that can be programmed (by executing a software program) to perform a set of functions for the non-volatile storage controller 801. In other embodiments, the internal processing unit 814 is a finite state machine (i.e., non-programmable hardware based digital logic circuits) configured to perform a set of functions for the non-volatile storage controller 801. The internal processing unit 814 is configured to receive operation requests associated with the non-volatile storage controller 801 from the host system 850. Examples of such operation requests include a read request, an erase request, a write request, and any other data storage related requests. Each request is usually accompanied by a memory address to indicate a location in the array of non-volatile memories on which to operate the operation request.

When the internal processing unit 814 receives operation requests from the host system 850, the internal processing unit 814 is configured to group related operation requests together as different groups of related operation requests. Preferably, each group of related operation requests includes the same types of operations (common operations) to be performed at multiple memory address locations. For example, one group of related operations can include a read operation request for multiple address locations. Another group of related operations can include a read, erase, and then write operations for multiple address locations.

The internal processing unit 814 is then configured to send each group of related operations to the master controller 802. Upon receiving a group of related operations from the internal processing unit 814, the master controller 802 is configured to cause the local controllers 810a-810n to execute, in parallel, the related operations on the array of non-volatile memories (non-volatile memories 820a-820n) according to the memory addresses. As mentioned above, the group of related operations may include multiple commands (e.g., read and write) to be operated on a set of memory addresses. It is conceived that sending the set of addresses each time the internal processing unit 814 sends a command to the master controller 802 is very time consuming. As the capacity of new non-volatile memory storages grows, the longer it takes to send the set of addresses. Thus, in some embodiments, when the internal processing unit 814 issues multiple commands for the same set of memory addresses to the master controller 802, the internal processing unit 814 only sends the set of memory addresses to the master controller 802 once. For example, the internal processing unit 814 of some embodiments is configured to send the set of memory addresses along with a first command to the master controller 802. Then, the internal processing unit 814 is configured to send a second command to the master controller 802 without re-transmitting the set of memory addresses to the master controller 802. In some embodiments, the internal processing unit 814 and the master controller 802 are enabled to perform these transactions by using a shadow indicator.

The shadow indicator is default to be set as off. When the master controller 802 detects that the shadow indicator is off, the master controller 802 is configured to wait for a new set of addresses whenever it receives a new command issued from the internal processing unit 814. The master controller 802 is configured to then broadcast the new set of memory addresses along with the command to the local controllers 810a-810n. On the other hand, when the master controller 802 detects that the shadow indicator is on, the master controller 802 is configured to re-use the previously stored set of memory addresses. Thus, when the master controller 802 receives a new command from the internal processing unit 814 and detects that the shadow indicator is on, the master controller 802 is configured to then broadcast the previously stored set of memory addresses and the new command to the local controllers 810a-810n.

The shadow indicator can be implemented in different ways. In some embodiments, the shadow indicator is implemented as a shadow register that is part of the master controller 802. As shown, the master controller 802 includes a command register 805, a shadow register 806, and a set of address registers 807a-807n. In some embodiments, the internal processing unit 814 is configured to transmit the set of memory addresses to the master controller 802 by programming (or re-programming) the set of address registers 807a-807b. The internal processing unit 814 is also configured to transmit a command to the master controller 802 by programming (or re-programming) the command register 805. In addition, the internal processing unit 814 is configured to set the shadow indicator by programming (or re-programming) the shadow register 806.

In another aspect of the inventive subject matter, a master controller that includes a sequencer and a master controller queue is provided. The master controller queue allows the master controller to hold incoming commands to be processed and to relieve the internal processing unit to handle other operations for the host system while the master controller cooperate with the local controllers to execute the commands.

In some embodiments, the sequencer enables the master controller to derive a sequence of commands to broadcast to the local controllers, based on the group of related operations received from the internal processing unit, so that the master controller can broadcast commands to the local controller in the proper order to ensure data integrity.

As shown in FIG. 8, in addition to the command register 805, the shadow register 806, and the set of address registers 807a-807n, the master controller 802 also includes a master controller queue 803 and a sequencer 804. In some embodiments, the sequencer 804 is a pure hardware component that includes finite state machines, digital logic gates, transistors, etc. In other embodiments, the sequencer 804 can be implemented as a programmable chip with software that is executed on an internal processor within the sequencer 804. Upon receiving the groups of related commands from the internal processing unit 814 (in some embodiments, in the form of a set of memory addresses, and then one or more commands associated with the set of memory addresses), the sequencer 804 is configured to take the commands in the group and generate a sequence of commands that can be processed by the local controllers 810a-810n. For example, the group of related commands may include a read command and then a write command for a common set of memory addresses. Since certain types of non-volatile memory (e.g., flash memory) requires an erasure before writing new data onto a previously written address location of the non-volatile memory, the sequencer 804 in those situation is configured to generate a sequence of commands that include a read command, then an erase command to prepare the flash memory for the next write command, and then a write command to input new data in the newly prepared for write flash memory location. Other data operations that require strict sequence of low-level commands include flash initialization, pre-conditioning flash memory cells, read-modify-write operations, read-copy operations, read-copy to a new location operations, moving blocks of data from aged blocks in the flash memory to new locations, etc.

It is noted that the order of this sequence of commands is important, as data integrity will not be preserved if commands are executed out of order. Once the sequence of commands is derived, the master controller 802 is configured to store the sequence of commands in the master controller queue 803. The master controller 802 is configured to then process them one by one. In some embodiments, the master controller 802 is configured to first transmit or broadcast the set of memory addresses to the local controllers 810a-810n. The master controller 802 is configured to then pull the first command in the master controller queue 803, and broadcast the first command to the local controllers 810a-810n. After broadcasting the first command, the master controller 802 is configured to pull another command from the master controller queue 803 and broadcast the command to the local controllers 810a-810n, and repeat until master controller queue 803 is empty. In some embodiments, the master controller 802 is configured to store the sequence of commands in the master controller queue 803 in the same order that it was derived so that the master controller queue 803 will broadcast the commands to the local controllers 810a-810n in the proper order.

The master controller 802 is configured to retrieve a group of related commands from the master controller queue 803, use the sequencer 804 and master controller queue 803 to process the related commands as described above, and move on to the next group of related commands.

Figure 9:
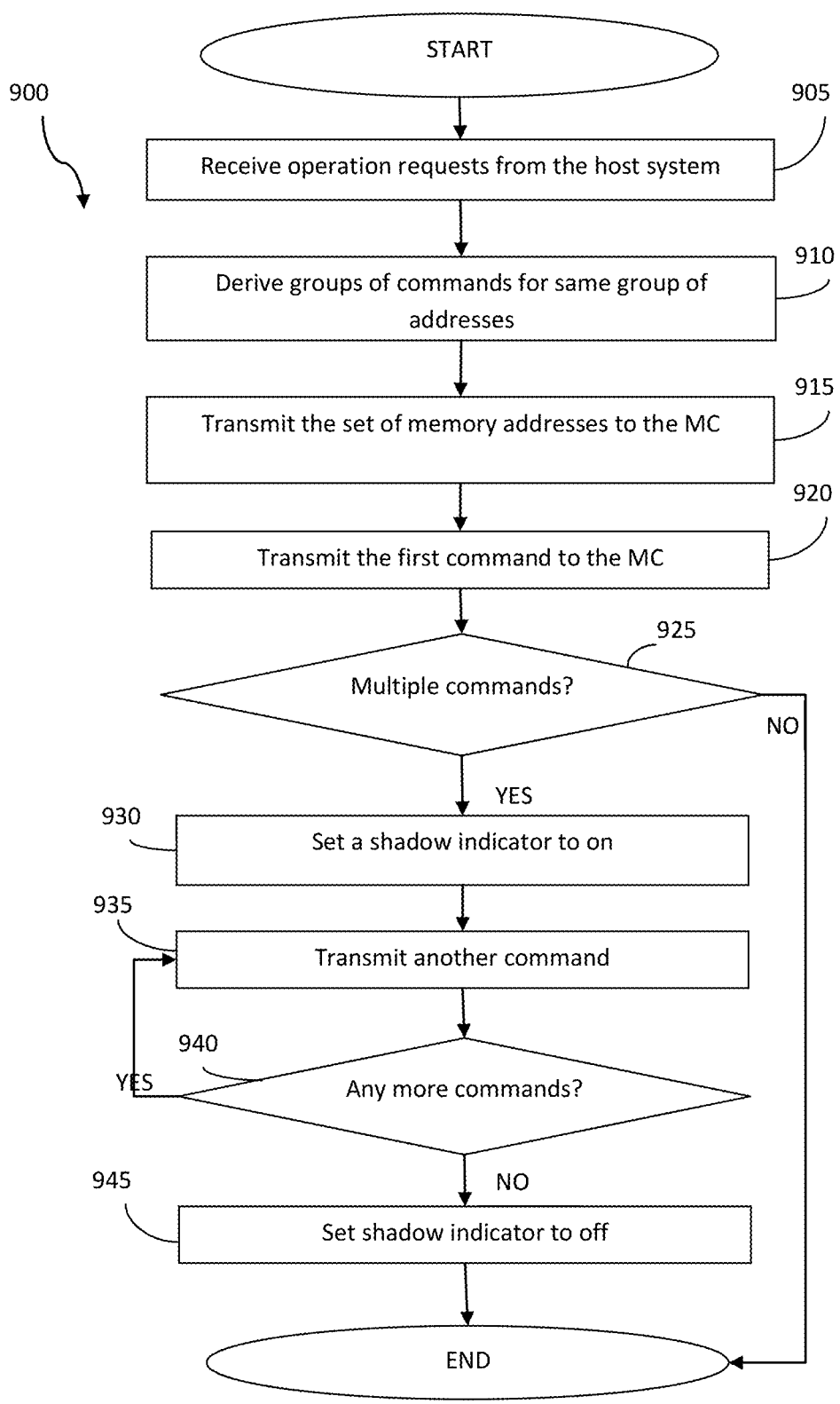
FIG. 9 illustrates a process of address shadowing performed by an internal processing unit of a non-volatile storage system of some embodiments.

FIG. 9 illustrates a process 900 performed by an internal processing unit of a non-volatile storage system of some embodiments to use address shadowing to facilitate communications between the internal processing unit and a master controller of the non-volatile storage system. The process 900 begins by receiving (at step 905) operation requests from a host system. Upon receiving the operation requests, the process 900 derives (at step 910) groups of commands based on the operation requests, where each group includes commands for a common set of memory addresses.

The process 900 then transmits (at step 915) the set of memory addresses and the first command (at step 920) to the master controller. As mentioned above, the internal processing unit of some embodiments transmits the set of memory addresses and the first command by programming/re-programming the set of address registers and command register of the master controller.

Depending on whether the group of commands includes multiple commands, the process 900 determines whether address shadowing is needed. Thus, in step 925, the process 900 determines whether multiple commands are included in the group of commands. If it is determined that there is only a single command in the group, the process 900 ends.

On the other hand, if it is determined that there are multiple commands in the group, the process 900 sets (at step 930) the shadow indicator to on. As mentioned above, the internal processing unit of some embodiments sets the shadow indicator by programming/re-programming a shadow register on the master controller. The process 900 then transmits (at step 935) another command to the master controller. In some embodiments, the internal processing unit transmits the other command by re-programming the command register of the master controller.

After transmitting the command, the process 900 determines (at step 940) whether there are more commands left to process from the group of commands. If there are more commands to process, the process 900 returns to step 935 to process another command and iterate through step 940. If it is determined that there are no more commands left to process from the group, the process 900 sets (at step 945) the shadow indicator to off. In some embodiments, the internal processing unit sets the shadow indicator by re-programming the shadow register of the master controller.

Figure 10:
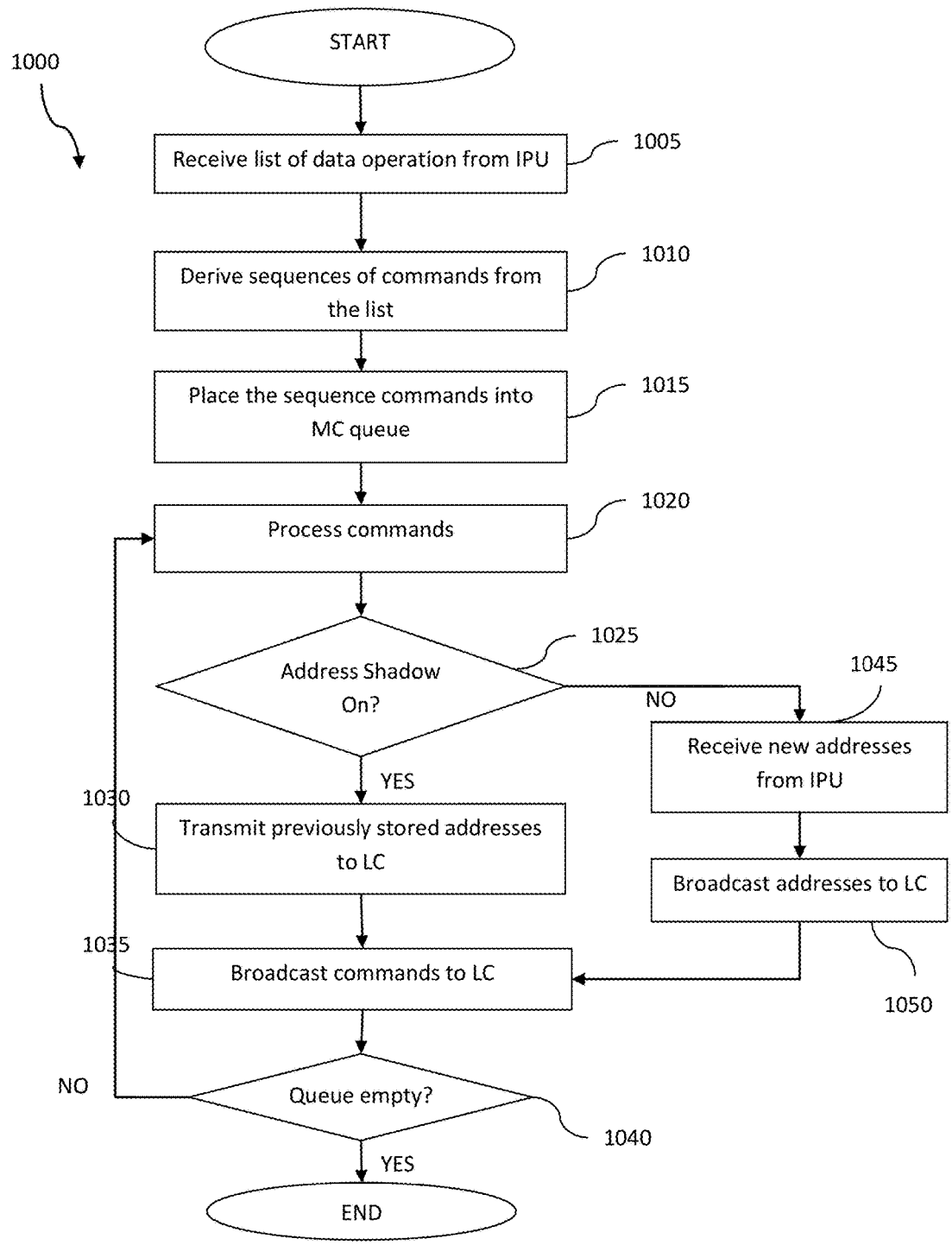
FIG. 10 illustrates a process of queuing and address shadowing performed by a master controller of a non-volatile storage system of some embodiments.

FIG. 10 illustrates a process 1000 performed by a master controller of a non-volatile storage system of some embodiments that utilizes address shadowing, master controller queue, and sequencing to facilitate communications with the internal processing unit and the local controllers. The process 1000 begins by receiving (at step 1005) a list of data operations from the internal processing unit. In some embodiments, the list of data operations includes groups of related commands.

The process 1000 then derives (at step 1010) a sequence of commands for each group of commands, and places (at step 1015) the derived sequence of commands in the master controller queue. After placing the sequence of commands in the queue, the process 1000 begins to process (at step 1020) the commands.

To process the commands, the process 1000 first determines (at step 1025) whether the shadow indicator is on. In some embodiments, the master controller can make that determination by checking the shadow register. If it is determined that the shadow indicator is off, the process 1000 has to first receive (at step 1045) new addresses from the internal processing unit, and then broadcast (at step 1050) the new addresses to the local controllers. On the other hand, if it is determined that the shadow indicator is on, the process 1000 does not have to wait for new addresses from the internal processing unit, instead the process 1000 transmits (at step 1030) the previously stored set of memory addresses (in the set of address registers) to the local controllers.

After sending the memory addresses (either newly received addresses or previously stored addresses) to the local controllers, the process 1000 broadcasts (at step 1035) the first command from the queue to the local controllers. The process 1000 then determines (at step 1040) whether the queue is empty or not. If the queue is empty, the process 1000 ends. On the other hand, if the queue is not empty, the process 1000 goes back to step 1020 to process another command from the queue, and iterate through steps 1040 until the queue is empty.

Figure 11:
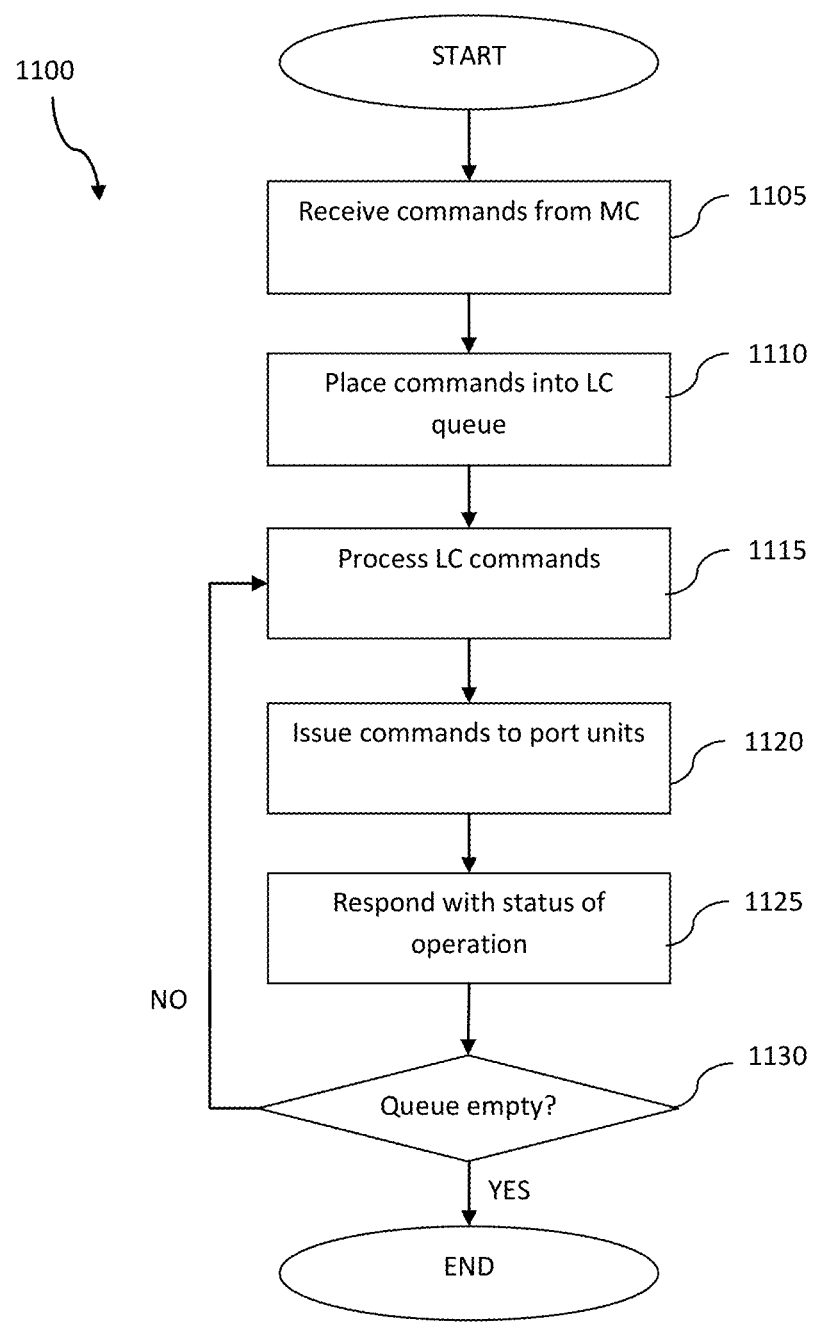
FIG. 11 illustrates a process of queuing performed by a local controller of a non-volatile storage system of some embodiments.

FIG. 11 illustrates a process 1100 performed by each of the local controllers in the non-volatile storage system 800 of FIG. 8. The process 1100 begins by receiving (at step 1105) commands and addresses from the master controller. The process 1100 then places (at step 1110) the commands into the local controller queue. After placing the commands into the queue, the process 1100 begins to process (at step 1115) the first command from the queue. The process 1100 processes the command by first issuing (at step 1120) the command to the port units, waiting for the execution, and after confirming that the command is executed, responding (at step 1125) to the master controller the status of operation.

The process 1100 then determines (at step 1130) if there the queue is empty. If it is determined that the queue is empty, the process 1100 ends. On the other hand, if it is determined that the queue is not empty, the process reverts to step 1115 to process another command in the queue, and iterates through step 1130 until the queue is empty.

Figure 12:
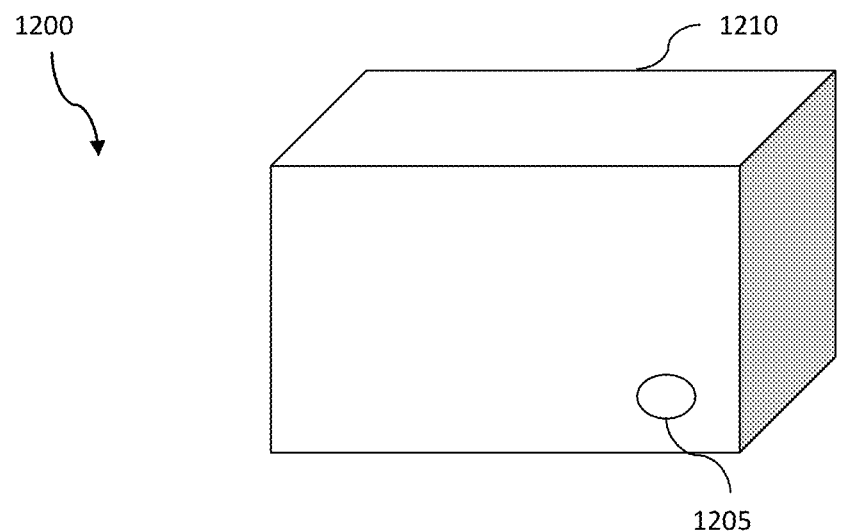
FIG. 12 shows an exemplary non-volatile storage unit of some embodiments.

In some embodiments, a non-volatile storage unit is provided. FIG. 12 illustrates an example non-volatile storage unit 1200. The non-volatile storage unit 1200 includes a housing 1210 that encloses the elements of the non-volatile storage controller 801 of FIG. 8. In some of these embodiments, the housing exposed a host system interface 1205. The host system interface 1205 can be implemented as an electronic connector that is configured to connect with the host system 850.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A storage system communicatively coupled with a host system, the storage system comprising:
an internal processing unit communicatively coupled with the host system;
an array of non-volatile memories;
a plurality of local controllers, wherein each local controller in the plurality of controllers corresponds to one non-volatile memory from the array of non-volatile memories and comprises a plurality of ports to communicate with the one non-volatile memory;
a master controller communicatively coupled with the internal processing unit and the plurality of local controllers, and configured to:
receive a group of related operations from the internal processing unit,
derive, based on the related operations, a sequence of commands having an order, and
broadcast the sequence of commands to the plurality of local controllers one at a time in the derived order.

2. The storage system of claim 1, wherein the sequence of commands comprises a first command and then a second command.

3. The storage system of claim 2, wherein the master controller is configured to broadcast the sequence of commands by first broadcasting the first command to the plurality of local controllers.

4. The storage system of claim 3, wherein the master controller is configured to broadcast the second command to the plurality of local controllers while the plurality of local controllers are executing the first command.

5. The storage system of claim 1, wherein the each local controller in the plurality of the local controllers has a commands queue.

6. The storage system of claim 5, wherein each local controller in the plurality of local controllers is configured to store the sequence of commands in the queue in the derived order.

7. The storage system of claim 6, wherein each local controller in the plurality of local controllers is configured to retrieve a command from the commands queue one at a time and execute the retrieved command.

8. The storage system of claim 7, wherein each local controller in the plurality of local controllers is configured to retrieve the commands from the commands queue in a first-in-first-out order.

9. The storage system of claim 1, wherein the group of related operations includes a set of memory addresses for which the related operations are to be executed.

10. The storage system of claim 9, wherein the master controller is configured to transmit the set of memory addresses to the plurality of local controllers before broadcasting the sequence of commands.

11. A storage system communicatively coupled with a host system, the storage system comprising:
an array of non-volatile memories;
a plurality of local controllers, wherein each local controller in the plurality of controllers corresponds to one non-volatile memory from the array of non-volatile memories and comprises a plurality of ports to communicate with the one non-volatile memory;
a master controller communicatively coupled with the plurality of local controllers;
an internal processing unit communicatively coupled with the host system and the master controller, and configured to:
receive operation requestts from the host system,
group related operation requests together as a first group of related operations and a second group of related operations,
transmit a set of memory addresses and the first group of related operations to the master controller,
set a shadow indicator to on, and
transmit the second group of related operations to the master controller without re-transmitting the set of memory addresses.

12. The storage system of claim 11, wherein the internal processing unit is further configured to
receive a list of data operations from the host system; and
determine, from the list of data operations, the group of related data operations that share a common set of memory addresses.

13. The storage system of claim 11, wherein the master controller has a command register, a set of address registers, and a shadow register.

14. The storage system of claim 13, wherein the internal processing unit is further configured to transmit the set of memory addresses to the master controller by programming the set of address registers according to the set of memory addresses.

15. The storage system of claim 14, wherein the internal processing unit is further configured to transmit the first group of related operations to the master controller by programming the command register according to the first group of related operations.

16. The storage system of claim 15, wherein the master controller is configured to, upon receiving the set of memory addresses and the first group of related operations, transmit the set of memory addresses stored in the set of address registers to the plurality of local controllers and broadcast the first group of related operations stored in the command register to the plurality of local controllers.

17. The storage system of claim 15, wherein the internal processing unit is further configured to transmit the second group of related operations to the master controller by re-programming the command register according to the second group of related operations without re-programming the set of address registers.

18. The storage system of claim 17, wherein the master controller is further configured to, upon receiving the second group of related operations, transmit the set of memory addresses stored in the set of address registers to the plurality of local controllers and broadcast the second group of related operations stored in the command register to the plurality of local controllers.

19. The storage system of claim 13, wherein the internal processing unit is further configured to set the shadow indicator to on by programming the shadow register.

20. The storage system of claim 11, wherein the internal processing unit is further configured to set the shadow indicator to off after transmitting the second group of related operations to the master controller.

* * * * *